(12) United States Patent
Natsume et al.

(10) Patent No.: US 6,701,073 B2
(45) Date of Patent: Mar. 2, 2004

(54) OPTICAL DRIVING UNIT, OPTICAL APPARATUS AND CAMERA SYSTEM

(75) Inventors: Satoshi Natsume, Kanagawa (JP); Kazumasa Yoshikawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/452,660

(22) Filed: May 30, 2003

(65) Prior Publication Data

US 2003/0223739 A1 Dec. 4, 2003

(30) Foreign Application Priority Data

Jun. 3, 2002 (JP) ........................................ 2002-162052
May 20, 2003 (JP) ........................................ 2003-141925

(51) Int. Cl.$^7$ .............................. G03B 5/00; G02B 7/08
(52) U.S. Cl. ........................... 396/76; 396/86; 359/697; 348/240.3
(58) Field of Search ............................ 396/76, 85–87, 396/103; 359/696–698; 348/240.3

(56) References Cited

U.S. PATENT DOCUMENTS

| 6,035,137 | A  | * | 3/2000 | Kaneko et al. ........... 396/76 |
| 6,285,511 | B1 | * | 9/2001 | Kanayama et al. ....... 359/696 |
| 6,385,399 | B1 | * | 5/2002 | Idemura ................... 396/63 |
| 6,522,838 | B1 | * | 2/2003 | Natsume et al. .......... 396/76 |
| 6,526,232 | B1 | * | 2/2003 | Mizumura ................ 396/72 |
| 6,597,517 | B2 | * | 7/2003 | Imaoka et al. ............ 359/697 |

FOREIGN PATENT DOCUMENTS

| JP | 5-14793 | 1/1993 | .......... H04N/5/232 |
| JP | 11-284994 | 10/1999 | ............ H04N/5/91 |
| JP | 2001-124977 | 5/2001 | ............ G02B/7/08 |
| JP | 2001-124978 | 5/2001 | ............ G02B/7/08 |
| JP | 2001-124979 | 5/2001 | ............ G02B/7/08 |

* cited by examiner

*Primary Examiner*—W. B. Perkey
(74) *Attorney, Agent, or Firm*—Morgan & Finnegan, LLP

(57) ABSTRACT

An optical driving unit is disclosed, which is equipped with a function for moving an optical adjustment member by servo-driving to a stored position, wherein the optical adjustment member is not moved against the operator's intent after manual driving while that function is being carried out. The optical driving unit includes a driving mechanism that allows servo-driving and manual driving of the optical adjustment member, and that allows manual driving of the optical adjustment member during servo-driving without necessitating a switching operation. It also includes a storage circuit that stores at least one driving position of the optical adjustment member, and a control circuit that performs preset driving control through which the optical adjustment member is servo-driven to the driving position stored in the storage circuit. The control circuit aborts the preset driving control if manual driving of the optical adjustment member is detected during the preset driving control.

10 Claims, 7 Drawing Sheets

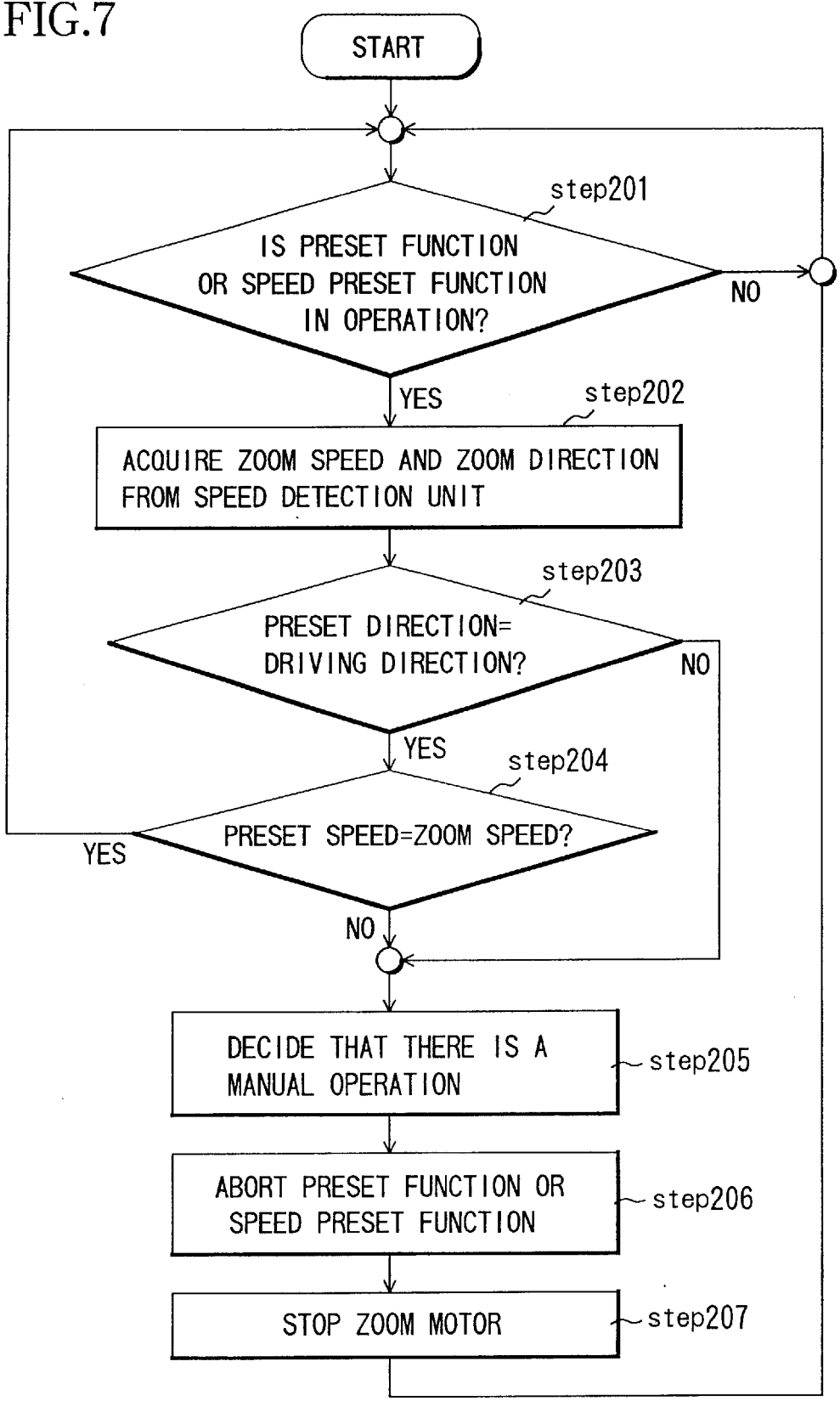

OPTICAL DRIVING UNIT, OPTICAL APPARATUS AND CAMERA SYSTEM

BACKGROUND OF THE INVENTION

1. Field of the Invention

The present invention relates to optical driving units used in optical apparatuses, such as TV cameras and video cameras.

2. Description of the Related Art

Conventionally, changes in servo-driving and manual driving for zoom operation used to be carried out by manually operating a mechanical clutch switching mechanism, but recently, both servo-driving and manual driving have come to be possible without necessitating this manual clutch switching (see Japanese Patent Laid-Open No. 1999-287944).

Furthermore, several methods have been adopted for TV and video image-taking. There is the image-taking method of changing the zoom position while imaging an object at a certain zoom position and then returning to the original zoom position and continuing the imaging, and there is also the image-taking method using presetting functions, as disclosed in Japanese Patent Laid-Open Nos. 2001-124977, 2001-124978 and 2001-124979. In these image-taking methods, a desired zoom position or speed is stored beforehand as preset information, and by turning on a preset switch during the image-taking, the zoom lens optical system is moved to that zoom position, or the zoom lens optical system is moved at the stored speed.

To perform this kind of image-taking method, a lens driving unit (also referred to as a "drive unit") is provided with a button-type switch, and the drive unit has a zoom operation function that is configured such that when this switch is operated, the zoom lens is moved in the direction towards the tele end (or the wide end), and when the switch is released, the zoom lens is returned to the original zoom position.

Furthermore, another image-taking method is one in which the camera operator sets the desired zoom position. That is to say, the lens driving unit is provided with a volume dial for setting the zoom position (over the entire range from telephoto end to wide-angle end) to which the camera operator wants to move the zoom, and the movement target of the zoom is set by operating this volume dial.

Then, when a button-type switch is operated, the zoom lens is servo-driven to the zoom position set with the volume dial, and when that switch is released, it returns to the original zoom position. In the following, this is referred to as "preset zoom reciprocating function."

Furthermore, there is also the method of storing a zoom position to be set in a storage circuit within the lens driving unit by operating a button-type operating member (switch).

Moreover, there are driving units provided with a plurality of button-type operating members (switches), that have a zoom operating function (preset function), with which, by operating the button-type operating members, a zoom position can be stored, the zoom can be moved into the direction of the zoom position, and stopped when it has reached the stored position. That is to say, the camera operator moves the zoom into the position preset beforehand, and by turning a MEMO (memory) switch on, the zoom position at that time is stored as the preset position. In the preset operation, the zoom is moved by motor-driven mechanism to the zoom position when turning a start switch on. The zoom driving speed at that time is a preset speed stored by a method similar to the setting position of a zoom speed setting volume, maximum speed, or the speed preset function described below.

With another speed preset function, in order to set a preset speed, the camera operator adjusts the operation amount of a zoom control switch such that it is set beforehand to the desired speed, the zoom is moved, and, by turning on a MEMO switch during the movement, the zoom speed and movement direction at that time are stored as the preset speed. In the preset operation, the zoom is then moved by motor-driven mechanism to the zoom end with the stored preset speed and direction by turning on a speed switch.

Thus, there are lens systems with which it is possible to servo-drive or manually drive the zoom without necessitating mechanical clutch switching, and that are provided with such zoom functions as a preset zoom reciprocating function.

In cameras equipped with an auto-focusing function (which is a function not used for the zoom portion), due to the auto-focusing characteristics, it is sometimes not possible to pursue the object with the auto-focus when imaging fast-moving objects or objects that are not well suited for auto-focusing. For this reason, when pursuing fast-moving objects or when trying to focus objects that are difficult to focus, it is preferable to switch to manual focusing and continue with the image-taking. There are examples of systems having a function with which this change between auto-focus and manual focus is not performed by a switch or the like, but instead the auto-focusing is immediately canceled when a manual focusing operation is detected, and priority is given to the manual focusing operation (see for example Japanese Patent Laid-Open No. 1993-14793).

However, if a lens system, in which instantaneous changing between servo-driving and manual driving of the zoom is possible without mechanical clutch switching, is equipped with the above-described preset zoom reciprocating function, preset function or speed preset function, then the camera operator may operate the zoom manually while the preset zoom reciprocating function is carried out. For example, when the object to be imaged is a bird or other animal, one often captures that image while gradually zooming in from a wide field angle with a constant slow (low-speed) zoom, until the animal fills out the image-taking area. In this case, the various preset zoom functions explained in above-described examples are all very useful. However, there is no guarantee that the animal and the bird will stay still in one place, and it will often move in the midst of zooming in. In that case, it is necessary to pursue the object.

In order to pursue the object in such a case even though the preset zoom function (or preset zoom reciprocating function, preset function, speed preset function) is currently being carried out, that function needs to be cancelled, and the camera operator needs to operate the zoom intentionally to decide the frame by his own intent. In this case, it is not desirable that at the moment when the camera operator has finished manual driving or thereafter, the zoom moves due to a continuation of the preset zoom function.

SUMMARY OF THE INVENTION

It is thus an object of the present invention to provide an optical apparatus that can be servo-driven and manually driven without switching a mechanical clutch and that is provided with a preset zoom function for driving an optical adjustment member by servo-driving using a stored position or a stored speed, wherein it can be prevented that the optical adjustment member is moved against the camera operator's intent after a manual operation while that function is being carried out.

In order to attain this object, a first optical driving unit according to the present invention includes a driving mechanism that allows servo-driving and manual driving of an optical adjustment member, the driving mechanism allowing manual driving of the optical adjustment member during servo-driving without necessitating a switching operation; a storage circuit that stores at least one driving position of the optical adjustment member; and a control circuit that performs preset driving control through which the optical adjustment member is servo-driven to the driving position stored in the storage circuit. The control circuit aborts the preset driving control if manual driving of the optical adjustment member is detected during the preset driving control.

In order to attain the above-stated object, a second optical driving unit according to the present invention includes a driving mechanism that allows servo-driving and manual driving of the optical adjustment member, the driving mechanism allowing manual driving of the optical adjustment member during servo-driving without necessitating a switching operation; a storage circuit that stores a driving speed of the optical adjustment member; and a control circuit that performs preset driving control through which the optical adjustment member is servo-driven at the driving speed stored in the storage circuit. The control circuit aborts the preset driving control if manual driving of the optical adjustment member is detected during the preset driving control.

These and further objects and features of the invention will become apparent from the following detailed description of preferred embodiments thereof taken in conjunction with the accompanying drawings.

BRIEF DESCRIPTION OF THE DRAWINGS

FIG. 7 is a flowchart illustrating an operation of a lens driving unit that is a part of the lens system of Embodiment 5.

DETAILED DESCRIPTION OF THE PREFERRED EMBODIMENTS

The following is an explanation of embodiments of the present invention, with reference to the accompanying drawings.

Embodiment 1

Figure 1:
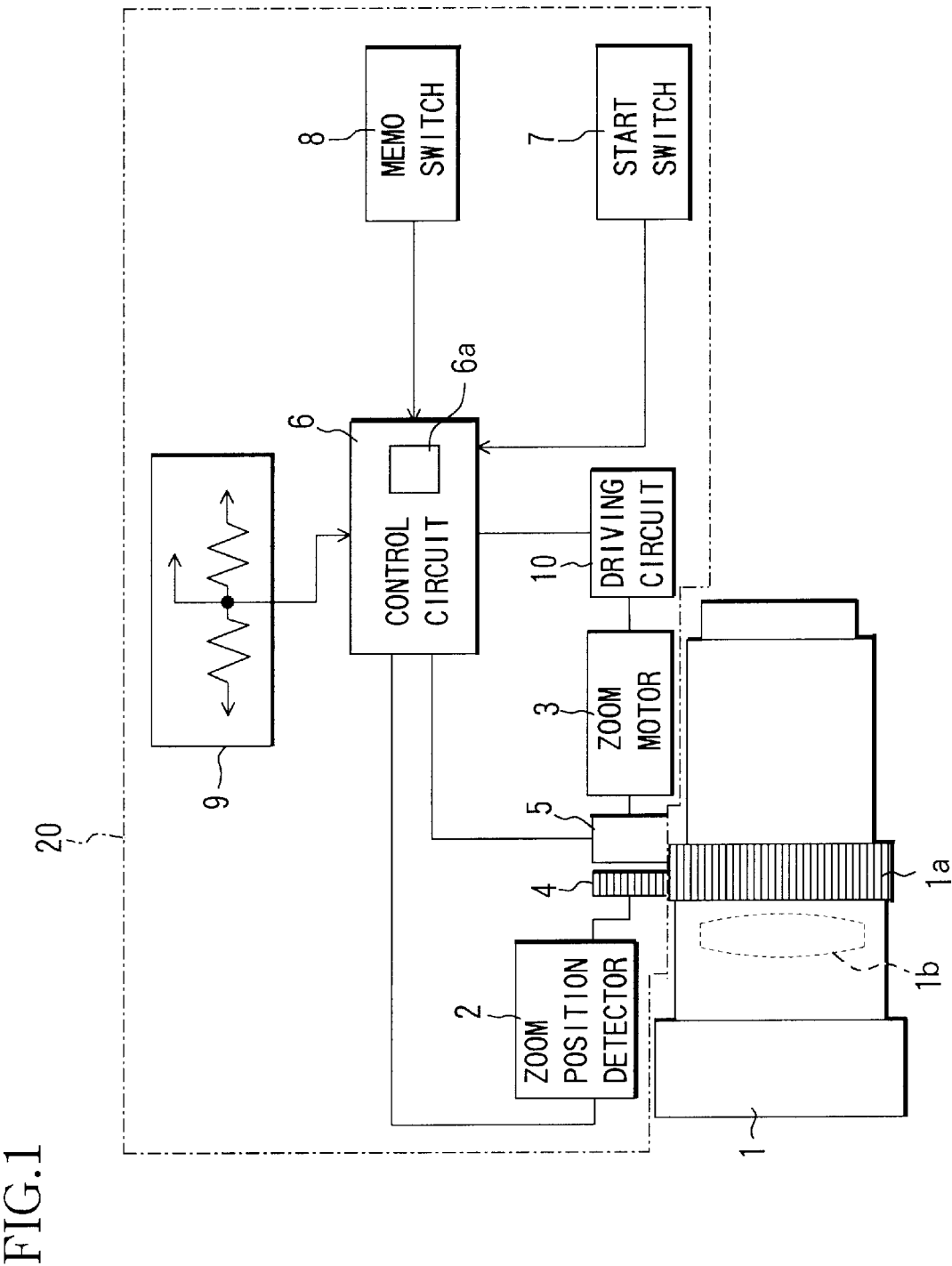
FIG. 1 is a diagram of a lens system according to Embodiment 1 of the present invention.

FIG. 1 shows the structure of a lens system (optical apparatus) in accordance with Embodiment 1 of the present invention. In FIG. 1, numerical reference 1 denotes an image-taking lens, and numerical reference 1a denotes a zoom driving ring. A manual driving force and a servo driving force for driving a zoom lens serving as an optical adjustment member are input into this zoom driving ring 1a. The zoom driving ring 1a is mechanically connected to a zoom lens 1b via a cam mechanism or the like, which is not shown in the figure. By rotating the zoom driving ring 1a, the zoom lens 1b is moved in the direction of the optical axis.

Numerical reference 20 denotes a lens driving unit (optical driving unit) mounted to the image-taking lens 1. In this lens driving unit 20, numerical reference 2 denotes a zoom position detector that is linked to the movement of the zoom lens 1b between the wide end and the tele end, and outputs a signal corresponding to its position. Numerical reference 3 denotes a zoom motor driving the zoom driving ring 1a, and numerical reference 4 denotes an idler gear that is attached to the rotation shaft of the zoom position detector 2, meshes with the zoom driving ring 1a on the image-taking lens 1, and rotates together with the zoom driving ring 1a.

Numerical reference 9 denotes a zoom operating switch that outputs, in order to servo-drive the zoom lens 1b, an instruction signal corresponding to its operation amount and operation direction. Numerical reference 6 denotes a control circuit comprising a CPU or the like, which outputs a control signal to the driving circuit 10 in response to the instruction signal from the zoom operating switch 9. The driving circuit 10 drives the zoom motor 3 in response to the entered control signal. Also otherwise, the control circuit 6 carries out the control of all functions within the lens driving unit 20.

Numerical reference 5 denotes a connection mechanism, for which an electromagnetic clutch is a typical example, and transmits the rotation of a member on the input side (not shown in the drawings) connected to the zoom motor 3 to a member on the output side (not shown in the drawings) that engages the zoom driving ring 1a, using friction or the like.

By turning the power to the electromagnetic clutch ON or OFF, it is possible to connect or disconnect the input-side member and the output-side member, and by changing the value of the electrical signal sent to it, it is possible to change the contact pressure between the input-side member and the output-side member, thus altering the connection torque.

For example, by driving the zoom motor 3 while the connection of the connection mechanism 5 has been set to ON, the driving power of the zoom motor 3 is transmitted via the zoom driving ring 1a to the zoom lens 1b, thus performing servo zoom driving.

When the camera operator manually operates the zoom driving ring 1a during servo zoom driving, then the control circuit 6 judges whether the speed of the zoom lens 1b (rate of change of the position of the zoom lens 1b as detected by the zoom position detector 2) is different from speed and direction as driven with the zoom motor 3, and if it is different, it judges that manual driving has been effected during servo-driving, and the connection of the connection mechanism 5 is set to OFF, enabling manual driving of the zoom lens 1b.

Then, when the zoom operating switch 9 is operated again, the control circuit 6 sets the connection of the connection mechanism 5 to ON, enabling servo-driving of the zoom lens 1b.

Numerical reference 7 denotes a start switch for starting the servo-driving of the zoom lens 1b with a preset zoom reciprocating function described later, and numerical reference 8 denotes a MEMO switch with which the camera operator can store beforehand a desired zoom position in a memory 6a provided in the control circuit 6.

Figure 5:
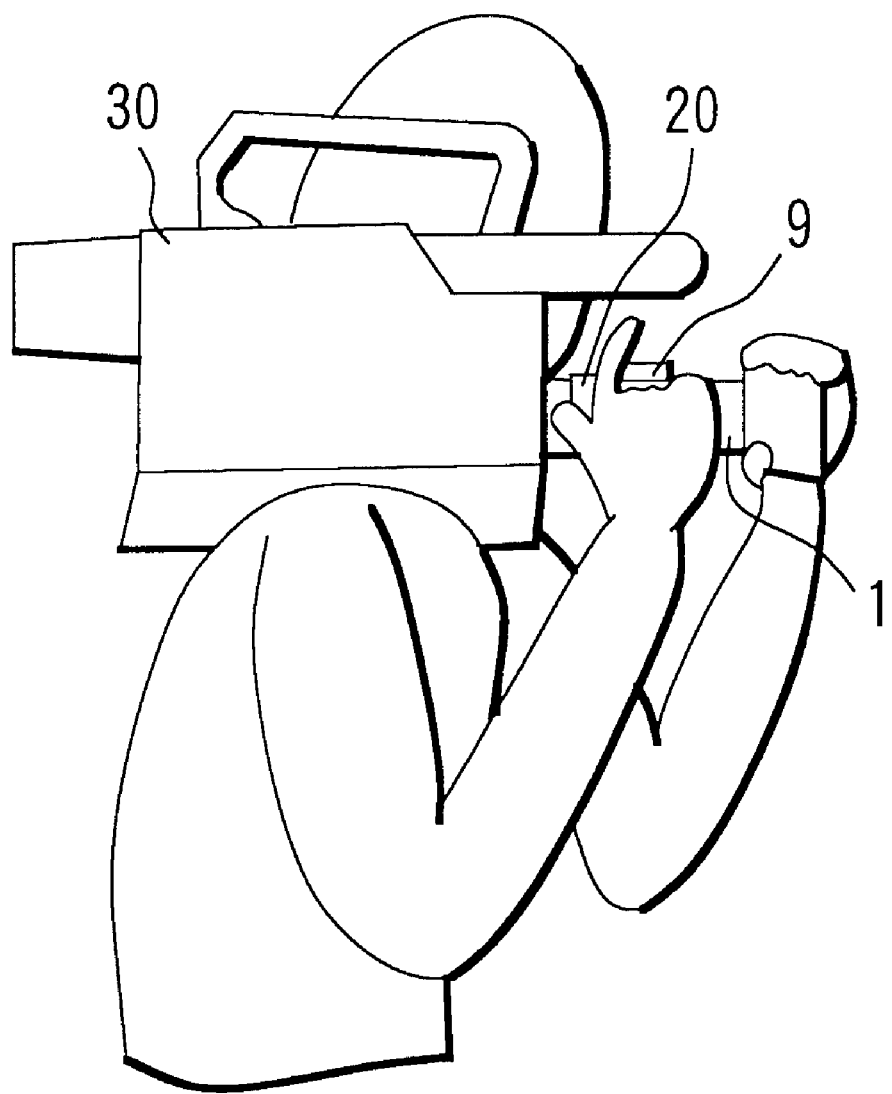
FIG. 5 is a sketch of a camera system in which a camera is equipped with the lens system.

The lens driving unit 20 configured as described above is mounted to an image-taking lens 1, and by mounting the image-taking lens 1 to a video camera 30 as shown in FIG. 5, it can be used for a camera system.

Figure 2:
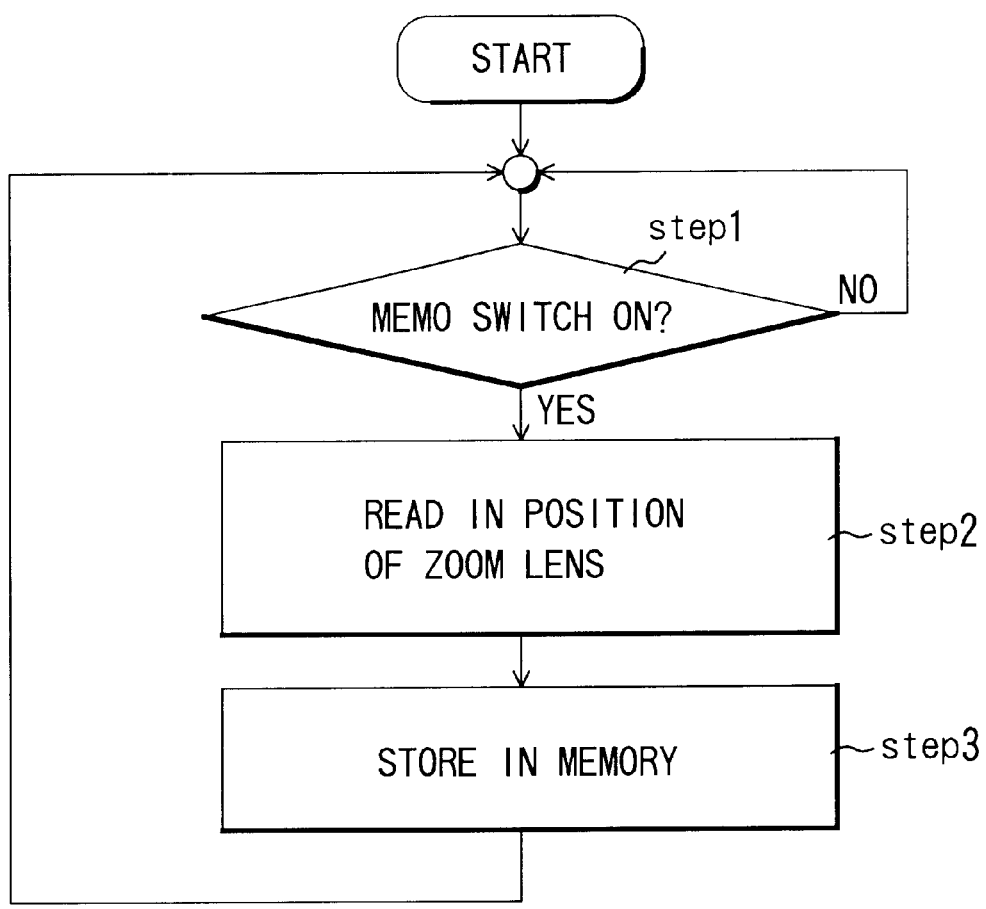
FIG. 2 is a flowchart illustrating an operation (zoom position storage operation) of a lens driving unit that is a part of the lens system.
Figure 4:
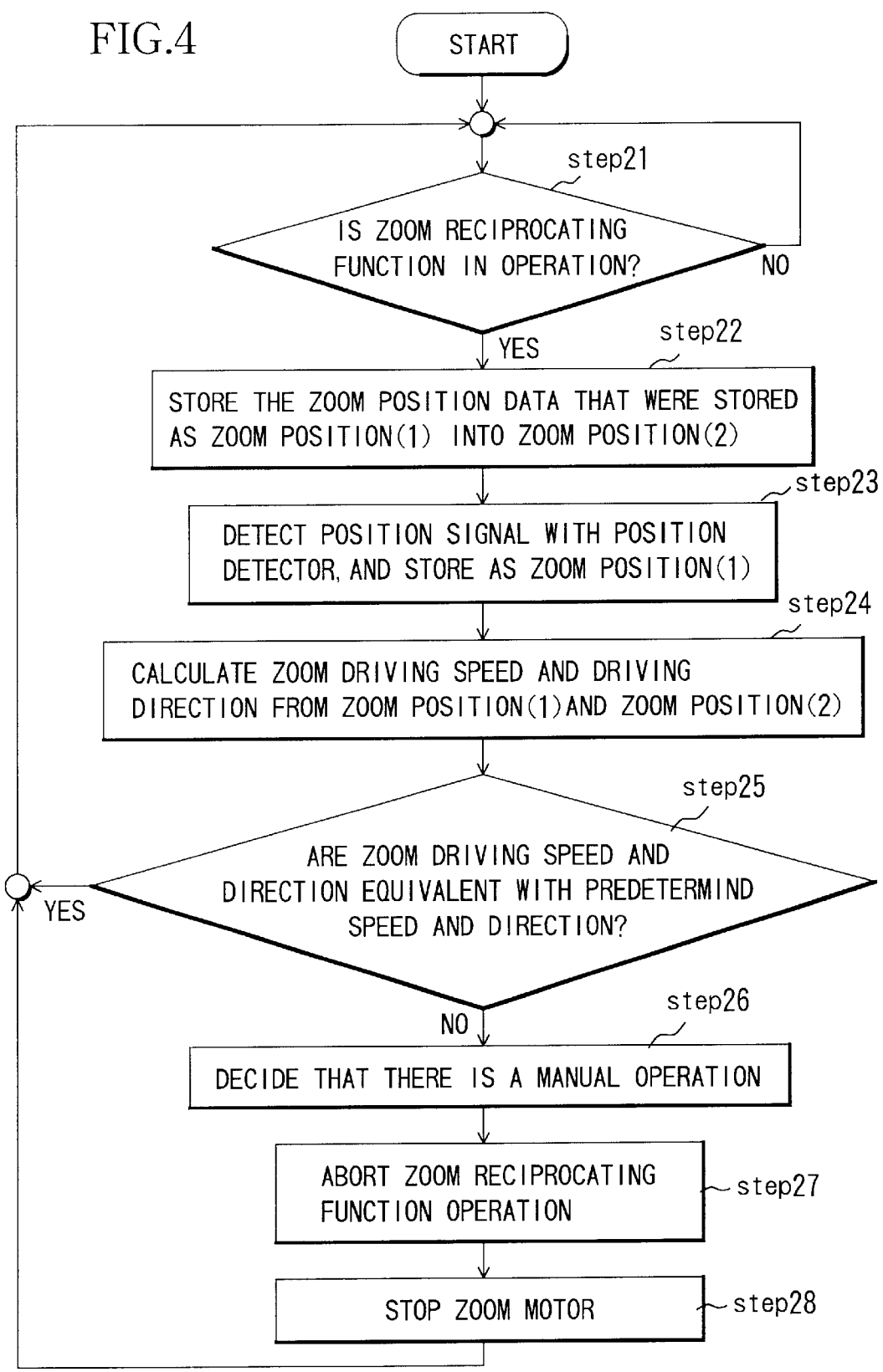
FIG. 4 is a flowchart illustrating another operation (discontinuance of preset zoom reciprocating function operation) of the lens driving unit.

Referring to the diagram in FIG. 1 and the flowcharts in FIGS. 2 and 4, the following is an explanation of the operation of the lens driving unit 20.

Here, the lens driving unit 20 (control circuit 6) of this embodiment is provided with a preset zoom reciprocating driving control function (referred to simply as "preset zoom reciprocating function" below) including a first driving control and a second driving control. In the first driving control, the zoom lens 1b is servo-driven, in response to operating the start switch 7 serving as a preset instruction member, to a first zoom position stored beforehand in a memory 6a in response to operating the MEMO switch 8. In the second driving control, the zoom position at the time when the start switch 7 was operated is stored in the memory 6a as a second zoom position, and the zoom lens 1b is servo-driven, in response to releasing the start switch 7, from the first zoom position to the second zoom position.

FIG. 2 shows the operation of the control circuit 6 when storing the first zoom position in the memory 6a before using the zoom reciprocating function.

The process flow shown in FIG. 2 is started when the power source of the lens driving unit 20 is turned on (for example when power is supplied from the video camera). The camera operator first operates the zoom switch 9, and the zoom lens 1b is moved to a desired zoom position between the tele end and the wide end.

Then, the control circuit 6 determines in Step 1 whether the MEMO switch 8 has been turned on. If it has been turned on, then the procedure advances to Step 2, the zoom position detected by the zoom position detector 2 is read in, and at the following Step 3, this zoom position (first zoom position) is stored in the memory 6a.

Figure 3:
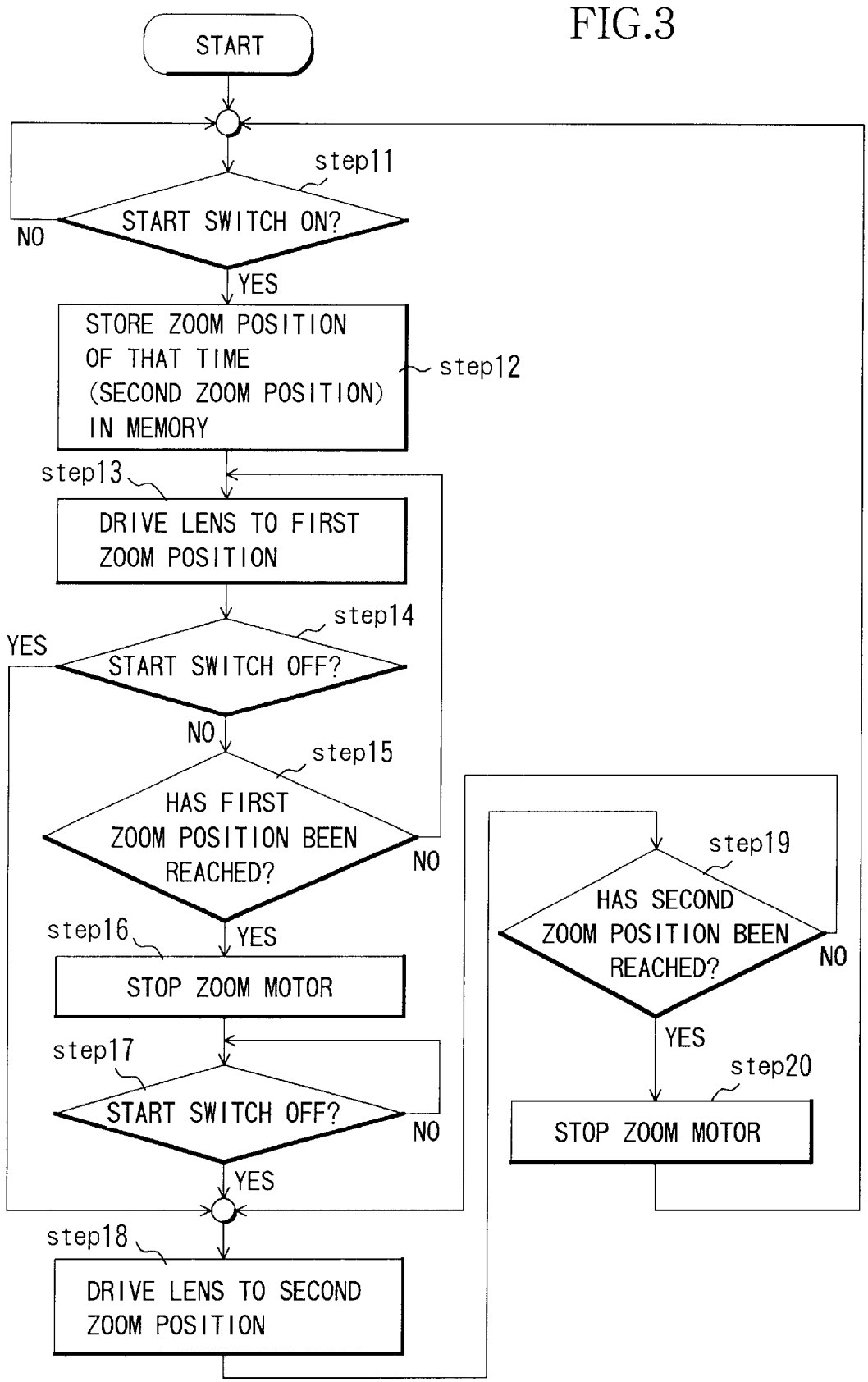
FIG. 3 is a flowchart illustrating another operation (preset zoom reciprocating function operation) of the lens driving unit.

FIG. 3 shows the operation of the control circuit 6 when executing the zoom reciprocating function. The process flow shown in FIG. 3 is started when the power of the lens driving unit 20 is turned on.

First, in Step 11, the control circuit 6 determines whether the start switch 7 has been turned on. If it has been turned on, then the procedure advances to Step 12, and the zoom position (second zoom position) detected by the zoom position detector 2 at the time when the start switch 7 has been turned on is stored in the memory 6a.

Then, the procedure advances to Step 13, the data of the first zoom position which has been stored in the memory 6a in accordance with the flowchart in FIG. 2 are read in, and the zoom motor 3 is driven by the driving circuit 10 such that the zoom lens 1b is moved at a predetermined speed to this first zoom position.

Next, in Step 14, it is determined whether the start switch 7 has been turned off. If the start switch 7 is turned off before the zoom lens 1b has reached the first zoom position, then the procedure jumps to Step 18, and the zoom motor 3 is driven such that, from that time onward, the zoom lens 1b approaches the second zoom position stored in the memory 6a in Step 12. If the start switch 7 is still on, then the procedure advances to Step 15, at which it is determined whether the zoom position detected by the zoom position detector 2 has reached the first zoom position. If the first zoom position has not yet been reached, then driving with the zoom motor 3 is continued. If the first zoom position has been reached, then the procedure advances to Step 16, and the zoom motor 3 (and thus the zoom lens 1b) is stopped. Then, having attained an angle of view corresponding to the first zoom position, the camera operator can perform the image taking. It should be noted that in this situation, the camera operator maintains the start switch 7 in the ON position.

Next, in Step 17, the control circuit 6 determines whether the start switch 7 has been turned off. If it has been turned off, the procedure advances to Step 18, and the zoom motor 3 is driven such that it approaches the second zoom position stored in the memory 6a in Step 12.

Then, in Step 19, it is determined whether the zoom position determined by the zoom position detector 2 has reached the second zoom position, and if the second zoom position has not yet been reached, then the driving of the zoom motor 3 is continued. If the second zoom position has been reached, then the procedure advances to Step 20, and the zoom lens 1b is stopped. Thus, the camera operator can perform image-taking at the same angle of view as before using the preset zoom reciprocating function (i.e. before turning the start switch 7 on).

FIG. 4 shows the operation of the control circuit 6 for the case that the zoom driving ring 1a is operated by hand (manual operation) during the execution of the above-described preset zoom reciprocating function. The process flow shown in FIG. 4 is started when the power of the lens driving unit 20 is turned on.

First, in Step 21, the control circuit 6 judges whether the preset zoom reciprocating function is currently being performed. If the preset zoom reciprocating is not currently being performed, then the judgment of Step 21 is repeated. In this case, it is possible to freely carry out regular servo-driving and manual driving (includes manual driving during regular servo-driving) of the zoom lens 1b.

On the other hand, if the preset zoom reciprocating function is being performed, then the procedure advances to Step 22. At Step 22, the first zoom position data, which have been stored beforehand in the memory 6a in response to the operation of the MEMO switch 8, or the second zoom position data, which have been stored in the memory 6a at the time when the start switch 7 was operated, are taken as the zoom position (1), replacing a zoom position (2), and stored again.

At Step 23, the control circuit 6 detects the current zoom position with the zoom position detector 2, and stores it as the zoom position (1).

Next, at Step 24, the speed of the zoom is calculated from the data of the zoom position (1) and the zoom position (2), and based on the signal from the zoom position detector 2, the movement direction or stopping state of the zoom lens 1b (zoom driving ring 1a) is established. Then, at Step 25, it is compared whether the predetermined zoom speed, movement direction and stopping state (state of Step 16 in FIG. 3) of the zoom lens 1b set in the preset zoom reciprocating function are equivalent to the actual speed, movement direction and stopping state obtained in Step 24.

Here, if both are the same, it is found that there is no external manual operation of the zoom driving ring 1a (in other words, manual driving of the zoom lens 1b), and the procedure returns to Step 21. On the other hand, if both are different, then the procedure advances to Step 26, it is found that manual driving (or stopping) of the zoom ring 1b is carried out with the zoom driving ring 1a instead of the servo-driving with the preset zoom reciprocating function, and the procedure advances to Step 27.

At Steps 27 and 28, in order to abort the preset zoom reciprocating function, the voltage application to the zoom motor 3 via the driving circuit 10 is cut, or the connection mechanism 5 is disconnected to cut the connection of the zoom motor 3, and no more driving force is transmitted. This stops the zoom motor 3 and the zoom lens 1b. Thus, after the camera operator releases his/her hand from the zoom driving ring 1a, the zoom lens 1b will not be moved by a continuation of the preset zoom reciprocating function.

It should be noted that this embodiment has been explained for the case that only one zoom position is stored in the memory 6a as the first zoom position, but it is also possible to store a plurality of zoom positions as first zoom positions in the memory 6a, and to make it possible to select one of those first zoom positions with a switch.

Embodiment 2

The present invention can also be applied to cases in which a preset zoom control function other than the preset zoom reciprocating function explained in Embodiment 1 above is provided.

For example, the present invention can also be applied to a lens driving unit provided with a preset zoom reciprocating function performing a first driving control and a second driving control, wherein the first driving control servo-drives the zoom lens 1b to a predetermined drive end (telephoto end or wide-angle end) in response to operating the start switch 7 serving as a preset instruction member, and the second driving control stores the zoom position at the time when the start switch 7 was operated in the memory 6a, and servo-drives the zoom lens 1b from that drive end to the stored zoom position in response to releasing the start switch 7.

In that case, the control circuit 6 drives the zoom lens 1b towards the predetermined drive end in Step 13 of FIG. 3, instead of to the first zoom position, and the driving of the zoom lens 1b is stopped when that drive end has been reached in Steps 15 and 16.

Moreover, in this case, the method for controlling the discontinuance of the preset zoom reciprocating function and detecting manual driving by manual driving detection while performing the preset zoom reciprocating function is the same as explained in Embodiment 1.

Embodiment 3

Embodiment 1 and Embodiment 2 were explained for the driving of a zoom lens 1b, but the present invention can also be applied to the driving of focus lenses, aperture units (adjusting the light amount by moving diaphragm blades) and other optical adjustment members.

Embodiment 4

Embodiment 1 has been explained for a lens driving unit 20 mounted to an image-taking lens 1 and including a servo-driving system, but the present invention can also be applied to large image-taking lens systems (optical apparatuses), in which the image-taking lens and the servo driving system are accommodated within one housing (that is, the lens driving unit explained in the above embodiments is accommodated within one housing together with the image-driving lens), and that can be connected to a servo actuator unit, such as a demand.

Embodiment 5

Figure 6:
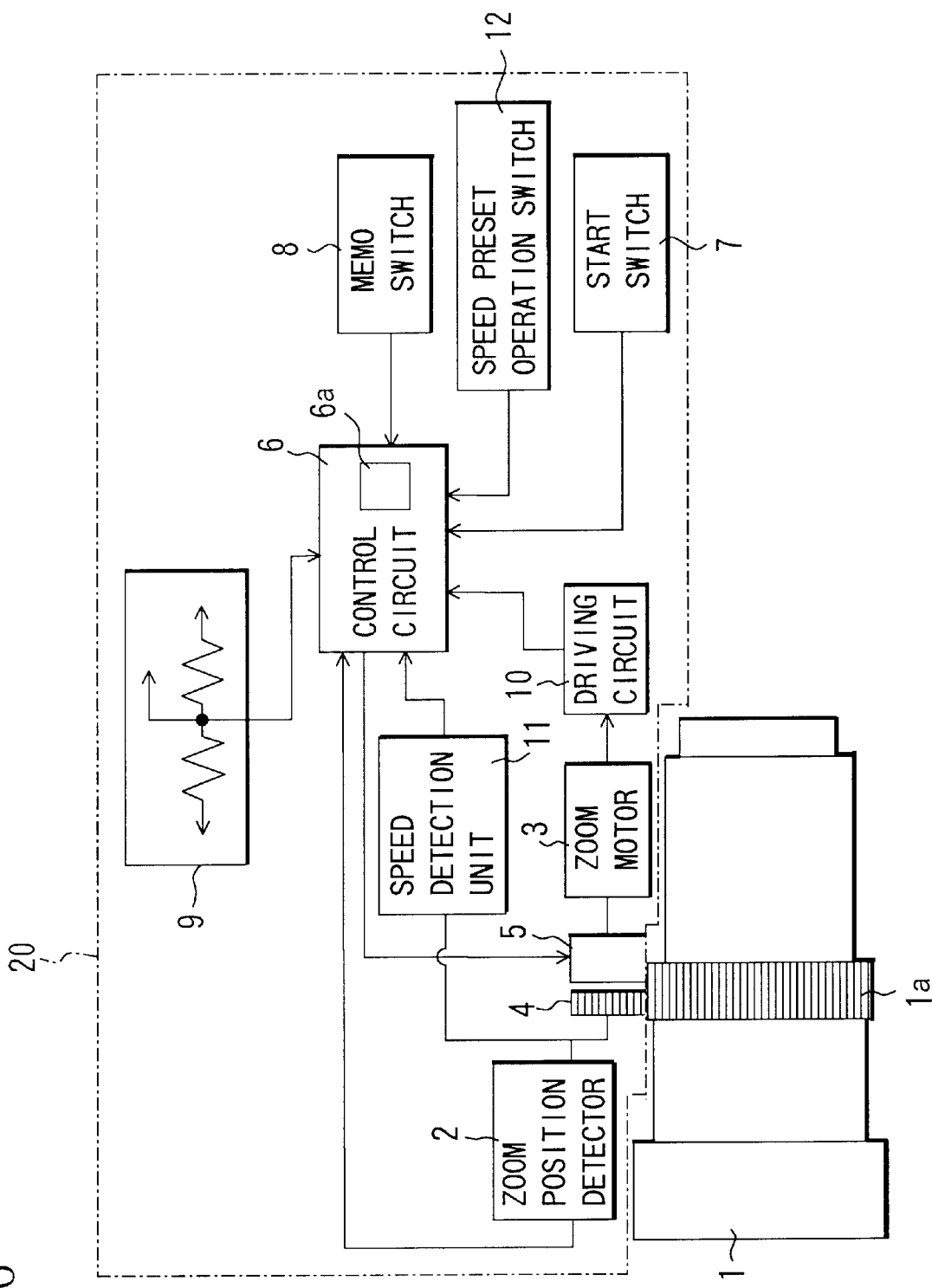
FIG. 6 is a diagram of a lens system according to Embodiment 5 of the present invention.

FIG. 6 shows the configuration of a lens system (optical apparatus system) in accordance with Embodiment 5 of the present invention. Explanations of aspects in FIG. 6 that are the same as in FIG. 1 are omitted. Numerical reference 11 denotes a speed detection unit, which outputs a speed signal corresponding to the driving speed of the zoom lens, and numerical reference 12 denotes a speed preset operation switch, which instructs beginning and end of the speed preset operation.

Referring to the diagram in FIG. 6 and the flowcharts in FIG. 7, the following is an explanation of the control operation of the preset function and the speed preset function in the lens driving unit 20 of this embodiment, which is configured as described above.

Here, the lens system of this embodiment is equipped with a function for enabling the preset function and the speed preset function, based on information that has been stored in a memory inside the control circuit 6 in response to an operation of the MEMO switch 8, by operating a switch serving as an operating means for initiating the preset operation.

The control circuit 6 judges whether the system is in preset operation or in speed preset operation (in preset function operation) or not (Step 201). If the system is in not preset function operation, then the judgment of Step 201 is repeated. In this situation, regular servo-driving and manual driving of the zoom lens (this includes manual driving during regular servo-driving) can be carried out freely.

On the other hand, if the system is presently in preset function operation, then the zoom speed and the zoom direction are obtained from the speed detection unit 11 (Step 202). Then, it is compared whether the movement direction that is the obtained zoom direction is equivalent to the preset direction that has been set (Step 203). If they are the same, then it is determined that the zoom direction has not changed, and the procedure advances to the speed judgment. If they are not the same, then it is determined that a load is acting from the outside, and that the zoom lens has been operated manually, and the procedure advances to the preset function discontinuance operation. In the speed judgment, it is judged whether the speed set as the speed for preset driving is equivalent to the zoom speed obtained in Step 202 (Step 204). If they are the same, then it is found that there has been no external load, that is, no manual operation with the zoom driving ring 1a, and the procedure returns to Step 201. On the other hand, if they are not the same, then it is judged that there has been a manual operation (Step 205), the voltage application to the zoom motor 3 via the driving circuit 10 is stopped, so that the preset function or the speed preset function are aborted (Step 206), or the connection mechanism 5 is disconnected to cut the connection of the zoom motor 3, and no more driving force is transmitted. This stops the zoom motor 3 (Step 207). Thus, even after the camera operator release his/her hand from the zoom driving ring 1a, the zoom lens 1b will not be moved anymore.

Embodiment 5 is particularly useful in the following image-taking situation.

For example, when the object to be imaged is a bird or other animal, one often captures that image while gradually zooming in from a wide field angle with a constant slow (low-speed) zoom, until the animal fills out the image-taking area. In this case, the various preset zoom functions explained in above-described examples are all very useful. However, there is no guarantee that the animal will stay still in one place, and it will often move in the midst of zooming in. In that case, it is necessary to pursue the object, and the flow of FIG. 7 of this embodiment becomes necessary.

Here, "slow (low-speed) zoom" is defined as a zoom that moves through the entire range of the zoom lens (from the wide end to the tele end) in at least five seconds, at a speed that is slower than the fastest speed of the regular servo (electromotive) zoom function.

As explained above, with these embodiments, if an optical apparatus with which an optical adjustment member can be servo-driven and manually driven without necessitating the switching operation of a mechanical clutch has been provided with a preset driving control function such as the function of reciprocating the optical adjustment member by servo-driving, then this driving control can be aborted when manual driving is detected during that driving control, and thereafter, movement of the optical adjustment member by servo-driving (movement by continued preset driving control) can be avoided.

While preferred embodiments have been described it is to be understood that modification and variation of the present invention may be made without departing from the scope of the following claims.

What is claimed is:

1. An optical driving unit driving an optical adjustment member that causes an optical effect by moving, comprising:
    a driving mechanism that allows servo-driving and manual driving of the optical adjustment member, the driving mechanism allowing manual driving of the optical adjustment member during servo-driving without necessitating a switching operation;
    a storage circuit that stores at least one driving position of the optical adjustment member; and
    a control circuit that performs a preset driving control through which the optical adjustment member is servo-driven to the driving position stored in the storage circuit;
    wherein the control circuit aborts the preset driving control if manual driving of the optical adjustment member is detected during the preset driving control.

2. The optical driving unit according to claim 1,
    further comprising a detector that detects an actual driving state of the optical adjustment member;
    wherein, when a predetermined driving state of the optical adjustment member set in the preset driving control is different from the actual driving state of the optical adjustment member detected by the detector, then the control circuit detects that the optical adjustment member is manually driven during the preset driving control.

3. The optical driving unit according to claim 1,
    wherein the control circuit performs
        a first driving control wherein, in the preset driving control, the optical adjustment member is servo-driven to a first position stored beforehand in the storage circuit, in response to an operation of a preset instruction member for performing an instruction operation with regard to the preset driving control, and
        a second driving control wherein a driving position of the optical adjustment member at the time when the preset instruction member is operated is stored as a second driving position in the storage circuit, and the optical adjustment member is servo-driven from the first driving position to the second driving position, in response to releasing the operated preset instruction member.

4. The optical driving unit according to claim 1,
    wherein the control circuit performs
        a first driving control wherein, in the preset driving control, the optical adjustment member is servo-driven to a drive end of the optical adjustment member in response to an operation of a preset instruction member for performing an instruction operation with regard to the preset driving control, and
        a second driving control wherein a driving position of the optical adjustment member at the time when the preset instruction member is operated is stored in the storage circuit, and the optical adjustment member is servo-driven from the drive end to the stored driving position, in response to releasing the operated preset instruction member.

5. An optical driving unit driving an optical adjustment member that causes an optical effect by moving, comprising:
    a driving mechanism that allows servo-driving and manual driving of the optical adjustment member, the driving mechanism allowing manual driving of the optical adjustment member during servo-driving without necessitating a switching operation;
    a storage circuit that stores a driving speed of the optical adjustment member; and
    a control circuit that performs preset driving control through which the optical adjustment member is servo-driven at the driving speed stored in the storage circuit;
    wherein the control circuit aborts the preset driving control if manual driving of the optical adjustment member is detected during the preset driving control.

6. The optical driving unit according to claim 5,
    further comprising a detector that detects an actual driving state of the optical adjustment member;
        wherein, when a predetermined driving state of the optical adjustment member set in the preset driving control is different from the actual driving state of the optical adjustment member detected by the detector, then the control circuit detects that the optical adjustment member is manually driven during the preset driving control.

7. The optical driving unit according to claim 5, wherein the driving speed stored in the storage circuit is a speed that moves through an entire zoom range of the optical adjustment member from wide-angle end to telephoto end in at least five seconds.

8. An optical apparatus, comprising:
    an optical adjustment member that causes an optical effect by moving; and
    an optical driving unit according to claim 1.

9. A camera system, comprising:
    an optical apparatus according to claim 8; and
    a camera equipped with the optical apparatus.

10. An optical apparatus, comprising:
    an optical adjustment member that causes an optical effect by moving; and
    an optical driving unit according to claim 5.

* * * * *